United States Patent
Hsu (10) Patent No.: US 8,254,932 B2
(45) Date of Patent: Aug. 28, 2012

(54) METHOD OF HANDLING MOBILITY IN MULTIMEDIA BROADCAST MULTICAST SERVICE SINGLE FREQUENCY NETWORK IN A WIRELESS COMMUNICATION SYSTEM AND RELATED COMMUNICATION DEVICE

(75) Inventor: Chia-Chun Hsu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 51 days.

(21) Appl. No.: 12/891,814

(22) Filed: Sep. 28, 2010

(65) Prior Publication Data

US 2011/0077006 A1     Mar. 31, 2011

Related U.S. Application Data

(60) Provisional application No. 61/246,160, filed on Sep. 28, 2009.

(51) Int. Cl.
*H04W 36/00* (2009.01)
(52) U.S. Cl. .......................... 455/436; 370/329
(58) Field of Classification Search ............... 455/404.1, 455/436, 550.1; 370/328, 329
See application file for complete search history.

(56) References Cited

U.S. PATENT DOCUMENTS

| 2006/0146858 A1* | 7/2006 | Kim .............................. 370/432 |
| 2007/0153724 A1* | 7/2007 | Cheon et al. .................. 370/328 |
| 2011/0021224 A1* | 1/2011 | Koskinen et al. ............. 455/507 |

FOREIGN PATENT DOCUMENTS

| WO | 2008137354 A1 | 11/2008 |
| WO | 2009053879 A1 | 4/2009 |
| WO | 2009053933 A1 | 4/2009 |

OTHER PUBLICATIONS

European patent application No. 10011202.8, European applicatin filing date: Sep. 28, 2010, European Search Report mailing date: Feb. 4, 2011.
3rd Generation Partnership Project; Technical Specification Group Radio Access Network; Evolved Universal Terrestrial Radio Access (E-UTRA); Medium Access Control (MAC) protocol specification (Release 8) v8.6.0, Jun. 2009.
3rd Generation Partnership Project; Technical Specification Group Radio Access Network; Evolved Universal Terrestrial Radio Access (E-UTRA); Radio Resource Control (RRC) Protocol specification (Release 8) v.8.6.0, Jun. 2009. 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9) v9.0.0, Jun. 2009.
3GPP Technical Specification Group Services and System Aspects; Multimedia Broadcast/Multicast Service; Stage 1 V9.0.0, Jun. 2008.

* cited by examiner

*Primary Examiner* — Ajit Patel
*Assistant Examiner* — Myron K Wyche
(74) *Attorney, Agent, or Firm* — Winston Hsu; Scott Margo (57) ABSTRACT

A method of handling mobility in multimedia broadcast multicast service single frequency network (MBSFN) for a user equipment of a wireless communication system includes when the user equipment proceeds with an MBMS service and performs handover from a source cell to a target cell, checking whether a target MBSFN area which the target cell belongs to is the same as a source MBSFN area which the source cell belongs to, when the target MBSFN area is different from the source MBSFN area, receiving a multicast control channel (MCCH) corresponding to the target MBSFN area, checking whether the MBMS service is provided in the target MBSFN area, and when the MBMS service is provided in the target MBSFN area, sending a service join request to a target network of the wireless communication system, for continuing to receive the MBMS service.

7 Claims, 8 Drawing Sheets

METHOD OF HANDLING MOBILITY IN MULTIMEDIA BROADCAST MULTICAST SERVICE SINGLE FREQUENCY NETWORK IN A WIRELESS COMMUNICATION SYSTEM AND RELATED COMMUNICATION DEVICE

CROSS REFERENCE TO RELATED APPLICATIONS

This application claims the benefit of U.S. Provisional Application No. 61/246,160, filed on Sep. 28, 2009 and entitled "METHOD AND APPARATUS FOR handling Mobility with MBSFN IN A WIRELESS COMMUNICATIONS SYSTEM", the contents of which are incorporated herein.

BACKGROUND OF THE INVENTION

1. Field of the Invention

The present invention relates to a method of handling mobility in multimedia broadcast multicast service single frequency network (MBSFN) in a wireless communication system and related communication device, and more particularly, to a method of handling mobility in MBSFN for improving MBMS service continuity and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs). The LTE protocol stack can be segmented into access stratum (AS) layer and non-access stratum (NAS) layer. The AS layer includes sublayers as Layer 3, also known as the Radio Resource Control (RRC) layer, Layer 2, consisting of three sub-layers that are the Packet Data Convergence Protocol (PDCP) layer, the Radio Link Control (RLC) layer, and the Medium Access Control (MAC) layer, and Layer 1, also known as the Physical (PHY) layer. The NAS layer processes the signaling between the UE and the core network.

Recently, the 3GPP is involved in the further advancements for E-UTRA and proposes an LTE-Advanced system as an enhancement of the LTE system. Carrier aggregation, where two or more component carriers are aggregated, is introduced into the LTE-Advanced system in order to support wider transmission bandwidths, e.g. up to 100 MHz and for spectrum aggregation. A UE of the LTE-Advanced system can simultaneously receive and/or transmit on multiple component carriers. Carrier aggregation allows a UE to aggregate a different number of component carriers of possibly different bandwidths in uplink and downlink.

Evolved multimedia broadcast multicast service (E-MBMS) has been introduced in the LTE specification to broadcast or multicast TV, films, information such as free overnight transmission of newspaper in a digital form. Two important scenarios have identified for the E-MBMS: one is single-cell broadcast, and the other is MBMS single frequency network (MBSFN). The MBSFN is a simulcast transmission technique that realizes transmission of identical waveforms at the same time from multiple cells. Since the MBSFN transmissions from the multiple cells are closely time-synchronized, the MBSFN transmission arrived at the UE is regarded as a transmission from a single cell and the UE may treat the MBSFN transmission in the same way as multi-path components of a single cell transmission without additional complexity. An eNB belongs to only one MBSFN area and there is no overlapping between different MBSFN areas.

To realize E-MBMS, a downlink transport channel is required to be broadcasted in the entire coverage area of each cell in the MBSFN area, which is called a multicast channel (MCH). The MAC layer of the LTE system offers data transfer services between the MCH and logical channels including a multicast traffic channel (MTCH) and a multicast control channel (MCCH), which are point-to-multipoint channels for transmitting traffic data and control information. An MCCH is utilized for each MBSFN area and carries a message which lists all the MBMS services with ongoing sessions, transmitted by all cells within a corresponding MBSFN area except the reserved cell which does not contribute to the MBSFN transmission. MCCH change notification is done by an MBMS radio network temporary identifier (M-RNTI) on the physical downlink control channel (PDCCH).

For network controlled mobility in the RRC_CONNECTED mode, the E-UTRAN triggers a handover procedure based on radio conditions and load, and thereby decides which cell a UE should hand over to in order to maintain the radio link. The source eNB (which controls the source cell) requests the target eNB to prepare for the handover and the target eNB subsequently generates a handover message to order the UE to perform the handover. After receiving the handover message, the UE attempts to access the target cell according to a random access resource selection procedure, and upon successful completion of the handover, the UE sends a message to confirm the handover.

UEs that are receiving MBMS services in the RRC_IDLE mode performing cell reselection or are in the RRC_CONNECTED mode can obtain target cell MTCH information from the MCCH of the target cell. However, upon handover, mechanisms to deliver MCCH to UEs via a handover message are not supported. No new information is provided to help a UE in switching MBMS reception between MBSFN areas. Up to now, it is not clear in the specifications that how a UE continues MBMS reception when the UE performs handover from a source cell in an MBSFN area to a target cell in the same MBSFN area or different MBSFN area in which the same MBMS service is also provided. Also, it is not clear that which is responsible for indicating that the UE has already left the MBSFN area.

With the addition of carrier aggregation and the possibility of MBSFN dedicated frequency, it is predictable that an eNB may be associated with multiple MBSFN areas, which results in impact on UE mobility in MBSFN, including the mechanism of MCCH change notification and MBMS service continuity.

SUMMARY OF THE INVENTION

The present invention therefore provides a method of handling mobility in MBSFN in a wireless communication system and related communication device.

According to one example of the present invention, a method of handling mobility in MBSFN for a UE of a wireless communication system includes when the UE proceeds with an MBMS service and performs handover from a source cell to a target cell, checking whether a target MBSFN area which the target cell belongs to is the same as a source MBSFN area which the source cell belongs to; when the target MBSFN area is different from the source MBSFN area, receiving an MCCH corresponding to the target MBSFN area; checking whether the MBMS service is provided in the target MBSFN area; and when the MBMS service is provided in the target MBSFN area, sending a service join request to a target network of the wireless communication system, for continuing to receive the MBMS service.

According to another example of the present invention, a method of handling mobility in MBSFN for a UE of a wireless communication system includes when the UE proceeds with a first MBMS service provided in a first MBSFN area and performs handover from a source cell to a target cell, checking whether the first MBSFN area is included in a plurality of MBSFN areas which the target cell belongs to; when the first MBSFN area is not included in the plurality of MBSFN areas which the target cell belongs to, receiving a plurality of MCCHs corresponding to the plurality of MBSFN areas; checking whether the first MBMS service is provided in at least one of the plurality of MBSFN areas; and when the first MBMS service is provided in at least one of the plurality of MBSFN areas, sending a service join request to a target network of the wireless communication system, for continuing to receive the first MBMS service.

According to another example of the present invention, a method of handling mobility in MBSFN for a UE of a wireless communication system includes when receiving an MCCH change notification from a network of the wireless communication system, checking whether an MBSFN area identification corresponding to an MBSFN area in which a subscribed MBMS service is provided is included in the MCCH change notification, and when the MBSFN area identification is included in the MCCH change notification, receiving an MCCH corresponding to the MBSFN area in a next MCCH modification period.

According to another example of the present invention, a method of handling mobility in MBSFN for a network of a wireless communication system includes when performing handover for a UE of the wireless communication system, generating a handover message including at least an MBSFN area identification corresponding to at least an MBSFN area which a target cell belongs to, and transmitting the handover message to the UE.

According to another example of the present invention, a method of handling mobility in MBSFN for a network of a wireless communication system includes when a UE of the wireless communication proceeding with an MBMS service performs handover to a cell in which the MBMS service is not provided, informing an MBMS content provider providing the MBMS service the UE has unsubscribed to the MBMS service.

According to another example of the present invention, a method of handling mobility in MBSFN for a network of a wireless communication system includes when an MCCH is changed, transmitting an MCCH change notification including an MBSFN area identification corresponding to the MCCH to inform a UE of the wireless communication the MCCH is changed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
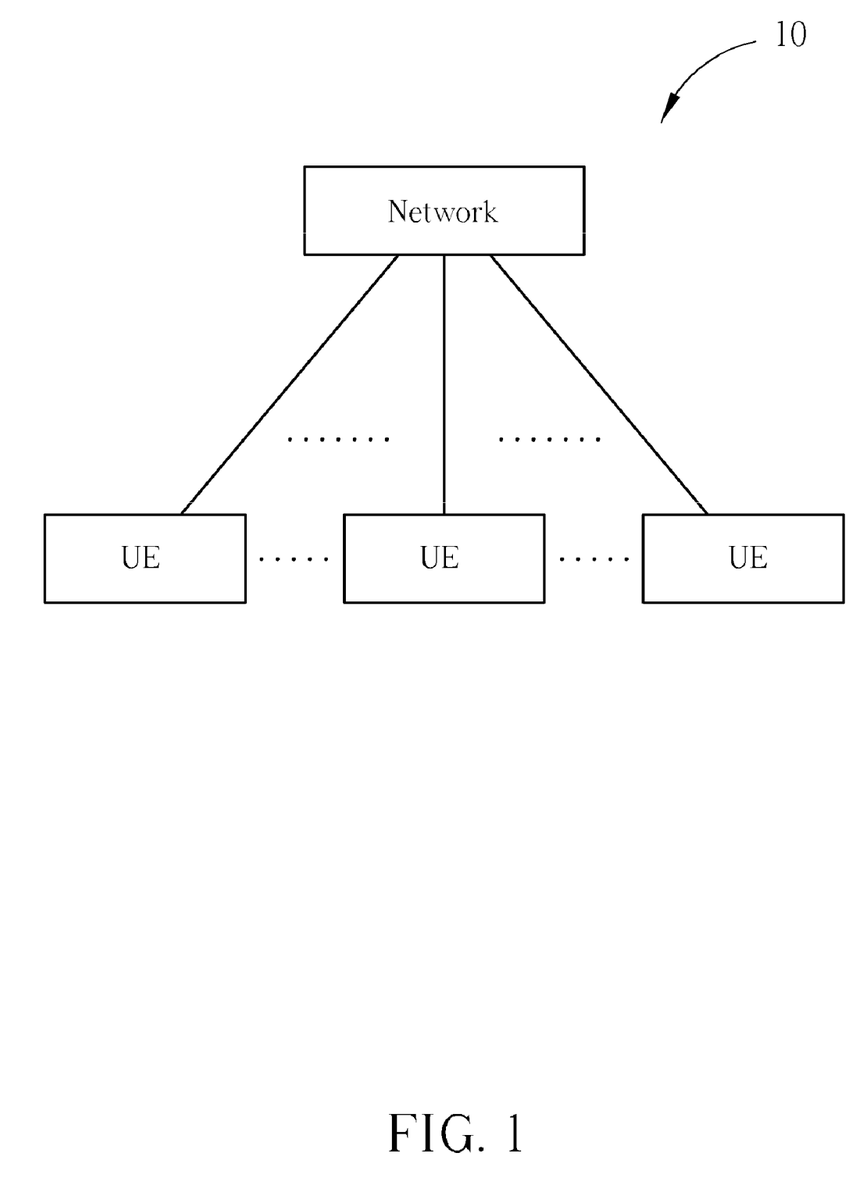
FIG. 1 is a schematic diagram of an exemplary wireless communication system.

Please refer to FIG. 1, which illustrates a schematic diagram of an examplary wireless communication system 10. Briefly, the wireless communication system 10 is composed of a network and a plurality of mobile devices. The wireless communication system 10 can be an LTE system, an LTE-advanced system, or any other similar network system supporting evolved multimedia broadcast multicast service (E-MBMS). In the LTE or LTE-Advanced system, the network can be referred as an E-UTRAN comprising a plurality of eNBs, and the mobile devices are referred as UEs. Each eNB is able to communicate with an MBMS content provider to receive MBMS data. The UEs can be devices such as mobile phones, computer systems, etc. This terminology will be used throughout the application for ease of reference; however, this should not be construed as limiting the disclosure to any one particular type of network. In some examples, the network and the UE may be seen as a transmitter or receiver according to transmission direction, e.g. for uplink, the UE is the transmitter and the network is the receiver, and for downlink, the network is the transmitter and the UE is the receiver.

Figure 2:
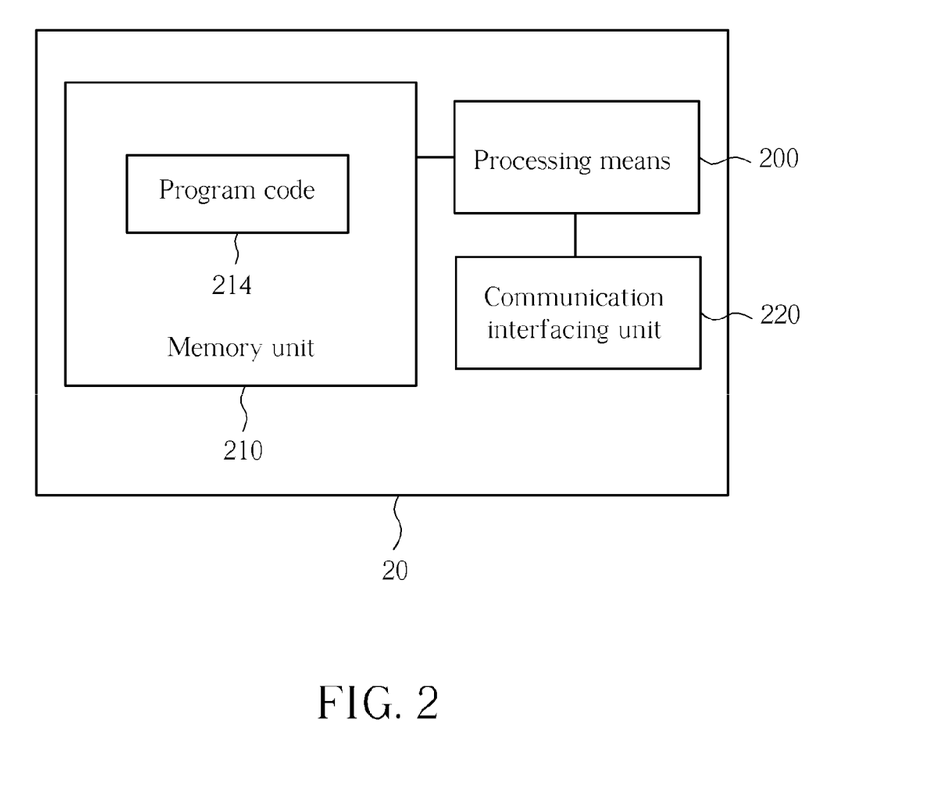
FIG. 2 is a schematic diagram of an exemplary communication device.

Please refer to FIG. 2, which is a schematic diagram of an exemplary communication device 20. The communication device 20 can be the network or the UE shown in FIG. 1 and may include a processing means 200 such as a microprocessor or ASIC, a memory unit 210, and a communication interfacing unit 220. The memory unit 210 may be any data storage device that can store program code 214 for access by the processing means 200. Examples of the memory unit 210 include but are not limited to a subscriber identity module (SIM), read-only memory (ROM), flash memory, random-access memory (RAM), CD-ROM, magnetic tape, floppy disk, and optical data storage device. The communication interfacing unit 220 is preferably a radio transceiver for wirelessly communicating according to processing results of the processing means 200.

Figure 3:
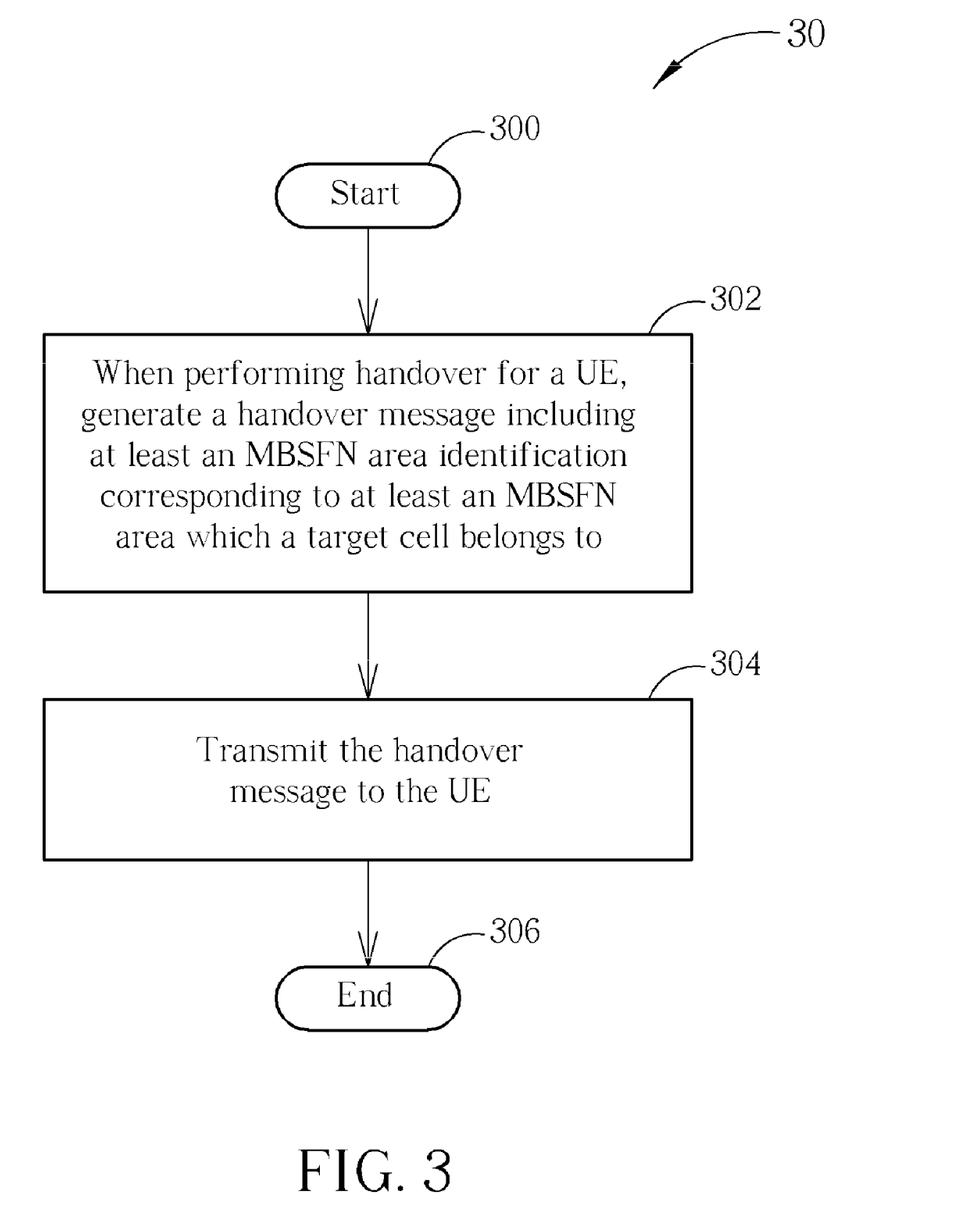
FIG. 3 to FIG. 8 are flowcharts of exemplary processes.

Please refer to FIG. 3, which is a flowchart of an exemplary process 30. The process 30 is utilized for handling mobility in multimedia broadcast multicast service single frequency network (MBSFN) for a network of the wireless communication system 10. The process 30 can be compiled into the program code 214. The process 30 includes the following steps:

Step 300: Start.

Step 302: When performing handover for a UE, generate a handover message including at least an MBSFN area identification corresponding to at least an MBSFN area which a target cell belongs to.

Step 304: Transmit the handover message to the UE.

Step 306: End.

The process 30 is performed by a target eNB, which is the eNB controlling a target cell a UE hands over to. According to the process 30, upon handover, the target eNB generates a handover message including at least an MBSFN area identification (ID) corresponding to at least an MBSFN area which the target cell belongs to, and transmits the handover message to the UE. Therefore, the UE knows the MBSFN areas to receive MBMS services after handover.

Moreover, when generating the handover message, the eNB includes not only the MBSFN area IDs but also information of multicast control channels (MCCHs) corresponding to the MBSFN areas in the handover message. As a result, if the subscribed MBMS service in the source cell is also provided in an MBSFN area which the target cell belongs to, the UE has opportunities to receive an MCCH corresponding to the MBSFN area to continue to receive the subscribed MBMS service.

Figure 4:
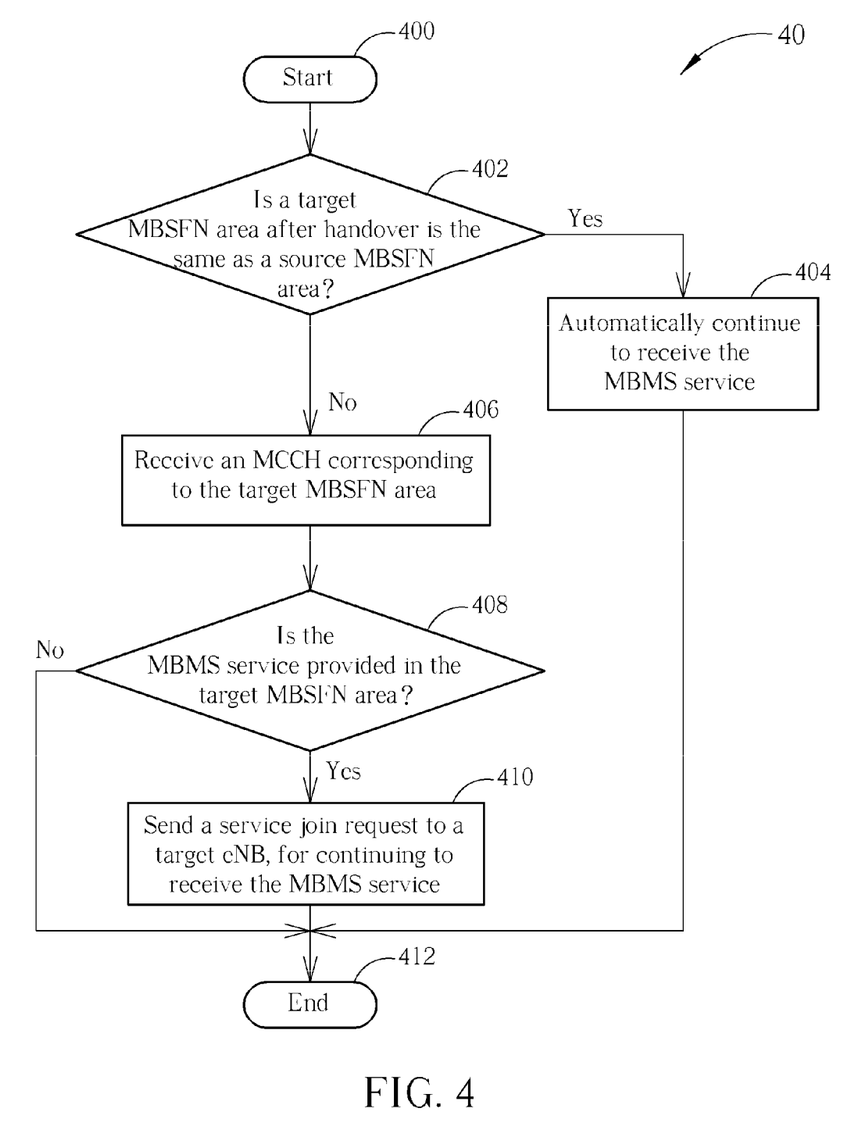

Please refer to FIG. 4, which is a flowchart of an exemplary process 40. The process 40 is utilized for handling mobility in MBSFN for a UE of the wireless communication system 10. The process 40 can be compiled into the program code 214. The process 40 includes the following steps:

Step 400: Start.

Step 402: When the UE proceeds with an MBMS service and performs handover from a source cell to a target cell, check whether a target MBSFN area which the target cell belongs to is the same as a source MBSFN area which the source cell belongs to. If yes, perform Step 404; else, perform Step 406.

Step 404: Automatically continue to receive the MBMS service.

Step 406: Receive a multicast control channel (MCCH) corresponding to the target MBSFN area.

Step 408: Check whether the MBMS service is provided in the target MBSFN area. If yes, perform Step 410; else, perform Step 412.

Step 410: Send a service join request to a target eNB which controls the target cell, for continuing to receive the MBMS service.

Step 412: End.

The UE performing the process 40 may cooperate with the eNB which performs the process 30 and belongs to only one MBSFN area in order to receive the handover message including information of the MCCH corresponding to the target MBSFN area which the target cell belongs to. According to Step 402, when the UE proceeds with a subscribed MBMS service and performs handover from a source cell to a target cell, the UE checks whether the target MBSFN area is the same as a source MBSFN area which the source cell belongs to, i.e. the UE checks whether the UE performs handover to the cell belonging to the same MBSFN area, and then performs Step 404 or Step 406 accordingly.

According to Step 404, when the target MBSFN area and the source MBSFN area are the same, the UE automatically continues to receive the MBMS service since the MBMS service is still provided. According to Step 406, when the target MBSFN area is different from the source MBSFN area, the UE receives an MCCH corresponding to the target MBSFN area and according to Step 408, the UE checks whether the MBMS service is provided in the target MBSFN area. When the UE knows that the subscribed MBMS service is also provided in the target MBSFN area, the UE sends a service join request to a target eNB, which controls the target cell, for continuing to receive the subscribed MBMS service. The subscription of the MBMS service can be manually or automatically controlled by a higher layer of the UE, e.g. Non-Access Stratum (NAS) layer. On the other hand, when the UE knows that the subscribed MBMS service is not provided in the target MBSFN areas after handover, the UE terminates the process 40. Through the process 40, the UE smoothly continues to receive the subscribed MBMS service after handover and the UE mobility in MBSFN is improved.

Figure 5:
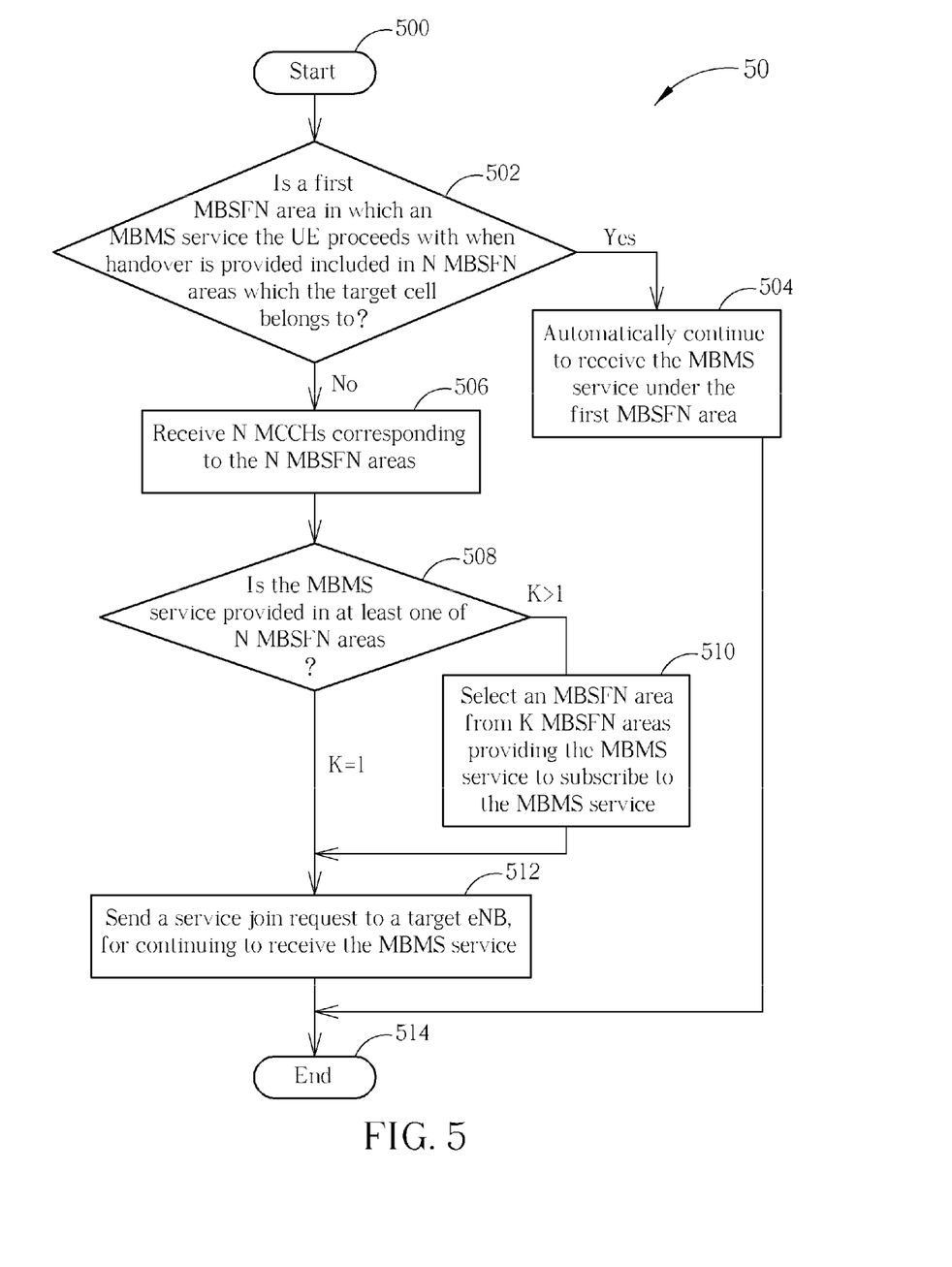

Please refer to FIG. 5, which is a flowchart of an exemplary process 50. The process 50 is utilized for handling mobility in MBSFN for a UE of the wireless communication system 10.

Note that, the UE performing the process 50 may subscribe to MBMS services in more than one MBSFN area and may cooperate with the eNB which performs the process 30 and belongs to more than one MBSFN area. The process 50 can be compiled into the program code 214. The process 50 includes the following steps:

Step 500: Start.

Step 502: When the UE proceeds with an MBMS service provided in a first MBSFN area and performs handover from a source cell to a target cell, check whether the first MBSFN area is included in N MBSFN areas which the target cell belongs to, where N>1. If yes, perform Step 504; else, perform Step 506.

Step 504: Automatically continue to receive the MBMS service under the first MBSFN area.

Step 506: Receive N MCCHs corresponding to the N MBSFN areas.

Step 508: Check whether the MBMS service is provided in at least one of the N MBSFN areas. Let the number of MBSFN areas providing the MBMS service be K. If the MBMS service is provided in one of N MBSFN areas (K=1), perform Step 512; or, if the MBMS service is provided in more than one of N MBSFN areas (K>1), perform Step 510.

Step 510: Select an MBSFN area from K MBSFN areas providing the MBMS service to subscribe to the MBMS service.

Step 512: Send a service join request to a target eNB, for continuing to receive the MBMS service.

Step 514: End.

According to Step 502, when the UE proceeds with a subscribed MBMS service S1 provided in an MBSFN area Ax and performs handover from a source cell to a target cell, the UE checks whether the MBSFN area Ax is included in MBSFN areas A1-AN the target cell belongs to, and performs Step 504 or Step 506 accordingly.

When the UE knows that the MBSFN area Ax is included in the MBSFN areas A1-AN, according to Step 504, the UE automatically continues to receive the MBMS service S1 under the MBSFN area Ax. On the other hand, when the UE knows that the MBSFN area Ax is not included, according to Step 506 and Step 508, the UE receives N MCCHs corresponding to the MBSFN areas A1-AN and checks whether the MBMS service S1 is provided in at least one of the MBSFN areas A1-AN according to the received MCCHs because the MBMS service S1 may also be provided in MBSFN areas besides the MBSFN area Ax.

When the UE knows that the MBMS service S1 is provided in one of the MBSFN areas A1-AN, which is denoted as Ay, according to Step 512, the UE directly sends a service join request to a target eNB for continuing to receive the MBMS service S1. Alternatively, when the UE knows that the MBMS service S1 is provided in more than one of the MBSFN areas A1-AN, according to Step 510, the UE selects an MBSFN area from the MBMS areas providing the MBMS service S1 and sends the service join request to the target eNB for continuing to receive the MBMS service S1.

Moreover, in the condition that the UE already subscribed to the MBMS service S1 in the MBSFN area Ay, when the UE wants to subscribe to another MBMS service S2 and the MBMS service S2 is also provided in the MBSFN area Ay, the UE selects the MBSFN area Ay prior to other MBSFN areas which also provides the MBMS service S2, to receive the MBMS service S2. In other words, when an MBMS service the UE wants to subscribe to is provided in more than one MBSFN area and there is an MBSFN area in which the UE already subscribed to MBMS services, the UE selects the same MBSFN area to receive the desired MBMS service.

Compared to the current 3GPP specifications in which the UE mobility in MBSFN are not clearly defined, the process 40 and the process 50 handle UE mobility in MBSFN, so that service continuity is improved.

Figure 6:
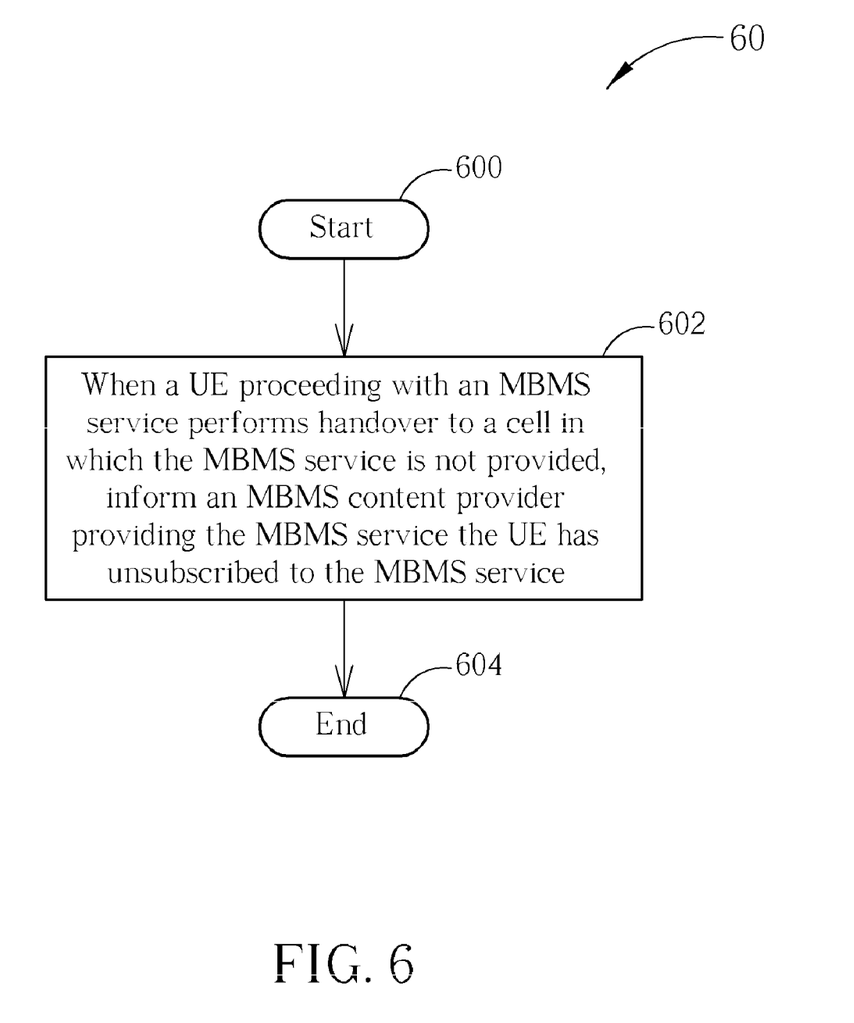

Please refer to FIG. 6, which is a flowchart of an exemplary process 60. The process 60 is utilized for handling mobility in MBSFN for the network of the wireless communication system 10. The process 60 can be compiled into the program code 214. The process 60 includes the following steps:

Step 600: Start.

Step 602: When a UE proceeding with an MBMS service performs handover to a cell in which the MBMS service is not provided, inform an MBMS content provider providing the MBMS service the UE has unsubscribed to the MBMS service.

Step 604: End.

The process 60 is utilized for the eNB to inform the MBMS content provider of the MBMS service unsubscription. When a UE proceeding with an MBMS service performs handover to a cell in which the MBMS service is not provided, the service continuity is no longer possible, and for this reason, the eNB informs the MBMS content provider which provides the MBMS service the UE has unsubscribed to the MBMS service. Through the process 60, the MBMS content provider is informed of the unsubscription and unnecessary transmissions between the MBMS content provider and the eNB are saved.

Figure 7:
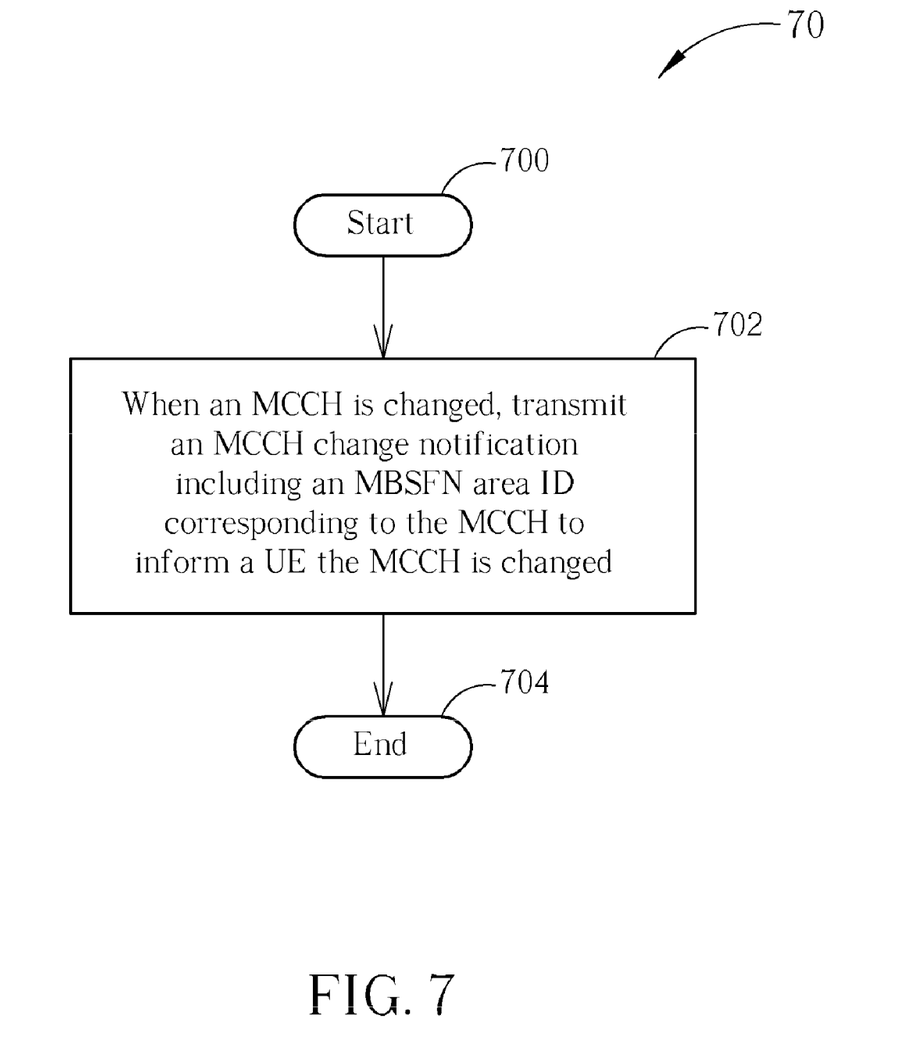

For the UE in MBSFN, service continuity is important not only when handover but also when MBMS services are changed. Please refer to FIG. 7, which is a flowchart of an exemplary process 70. The process 70 is utilized for handling mobility in MBSFN for the network of the wireless communication system 10. The process 70 can be compiled into the program code 214. The process 70 includes the following steps:

Step 700: Start.

Step 702: When an MCCH is changed, transmit an MCCH change notification including an MBSFN area ID corresponding to the MCCH to inform a UE the MCCH is changed.

Step 704: End.

When MBMS services provided in an MBSFN area are changed, e.g. a new service is added or an ongoing service is stopped, the MCCH corresponding to the MBSFN area is changed. According to the process 70, when an MCCH is changed, the eNB transmits an MCCH change notification including an MBSFN area ID corresponding to the MCCH, e.g. an MBMS radio network temporary identifier (M-RNTI), for informing a UE the MCCH is changed. When the UE is informed and knows the MCCH which will change is corresponding to the target MBSFN area, the UE wakes up to receive updated MCCH information. Otherwise, when the UE knows the MCCH which will change is not corresponding to the target MBSFN area, the UE does not wake up. Therefore, unnecessary wakeup of UE is avoided through the process 70.

Figure 8:
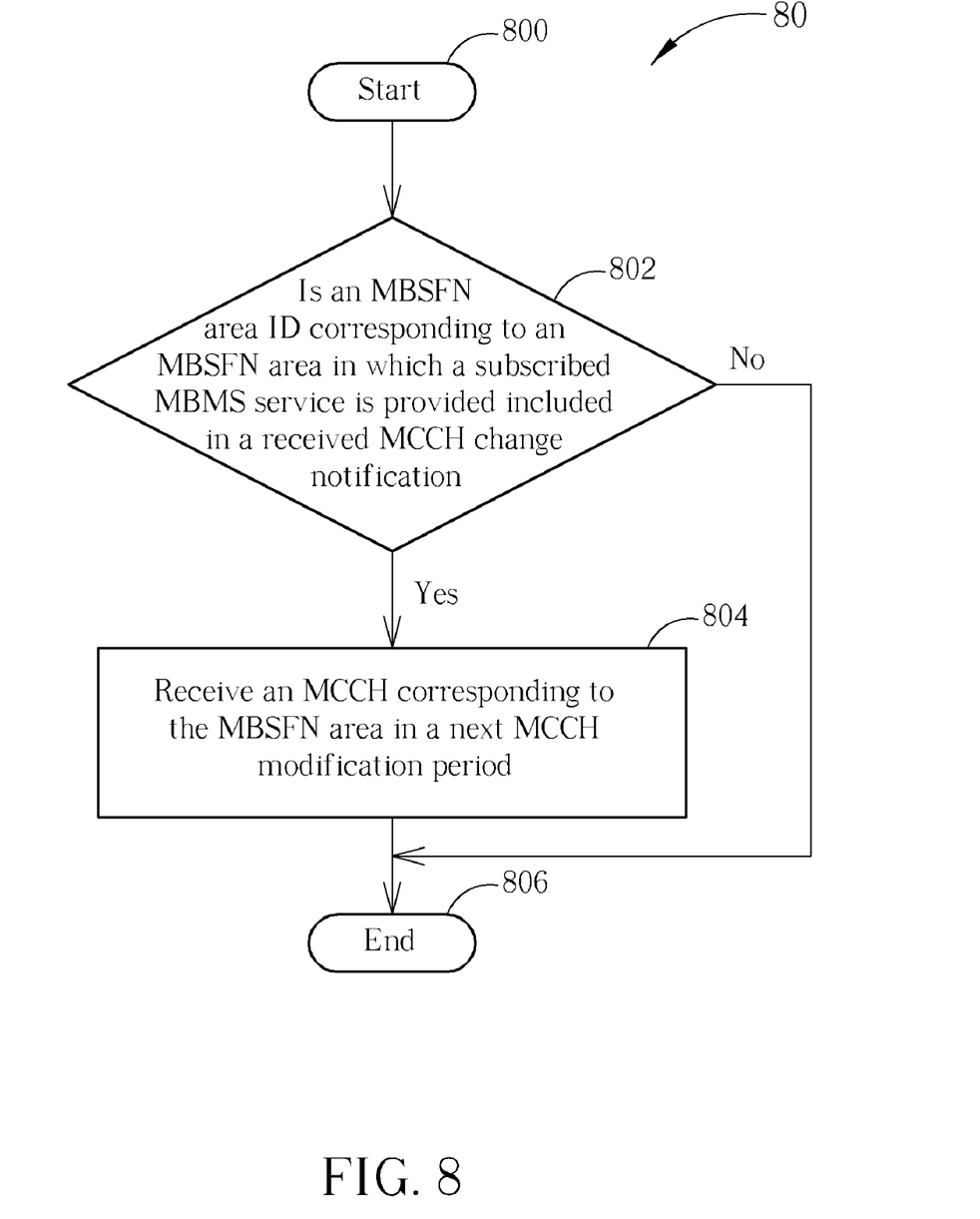

Please refer to FIG. 8, which is a flowchart of an exemplary process 80. The process 80 is utilized for handling mobility in MBSFN for a UE of the wireless communication system 10. The process 80 can be compiled into the program code 214. The process 80 includes the following steps:

Step 800: Start.

Step 802: When the UE receives an MCCH change notification, check whether an MBSFN area ID corresponding to an MBSFN area in which a subscribed MBMS service is provided is included in the MCCH change notification. If the MBSFN area ID is included, perform Step 804; else, perform Step 806.

Step 804: Receive an MCCH corresponding to the MBSFN area in a next MCCH modification period.

Step 806: End.

The UE performing the process 80 may cooperate with the eNB performing the process 70. According to Step 802, when the UE receives an MCCH change notification, e.g. M-RNTI on the PDCCH, the UE checks whether an MBSFN area ID corresponding to an MBSFN area in which a subscribed MBMS service is provided (which is called a subscribed MBSFN area, in short) is included in the MCCH change notification. In other words, the UE checks whether the subscribed MBMS service is changed. When the MBSFN area ID corresponding to the subscribed MBSFN area is included in the MCCH change notification, the UE receives an MCCH corresponding to the subscribed MBSFN area in a next MCCH modification period so as to know updated information of the subscribed MBMS service. Otherwise, when the MBSFN area ID is not included in the MCCH change notification, the UE terminates the process 80 and thereby avoids unnecessary wakeup.

Please note that the abovementioned steps of the process 30, 40, 50, 60, 70 or 80 including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, through the exemplary processes, UE mobility is clearly defined for the conditions when UE performs handover under the eNB belonging to one or multiple MBSFN areas and when MBMS services are changed, and therefore MBMS service continuity is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling mobility in multimedia broadcast multicast service single frequency network (MBSFN) for a user equipment (UE) of a wireless communication system, the method comprising:

when the UE proceeds with an MBMS service and performs handover from a source cell to a target cell, checking whether a target MBSFN area which the target cell belongs to is the same as a source MBSFN area which the source cell belongs to;

when the target MBSFN area is different from the source MBSFN area, receiving a multicast control channel (MCCH) corresponding to the target MBSFN area; checking whether the MBMS service is provided in the target MBSFN area; and when the MBMS service is provided in the target MBSFN area, sending a service join request to a target network of the wireless communication system, for continuing to receive the MBMS service.

2. The method of claim 1 further comprising:

when the target MBSFN area is the same as the source MBSFN area, automatically continuing to receive the MBMS service.

3. A method of handling mobility in multimedia broadcast multicast service single frequency network (MBSFN) for a user equipment (UE) of a wireless communication system, the method comprising:
- when the UE proceeds with a first MBMS service provided in a first MBSFN area and performs handover from a source cell to a target cell, checking whether the first MBSFN area is included in a plurality of MBSFN areas which the target cell belongs to;
- when the first MBSFN area is not included in the plurality of MBSFN areas which the target cell belongs to, receiving a plurality of multicast control channels (MCCHs) corresponding to the plurality of MBSFN areas;
- checking whether the first MBMS service is provided in at least one of the plurality of MBSFN areas; and
- when the first MBMS service is provided in at least one of the plurality of MBSFN areas, sending a service join request to a target network of the wireless communication system, for continuing to receive the first MBMS service.

4. The method of claim 3 further comprising:
- when the first MBSFN area is included in the plurality of MBSFN areas which the target cell belongs to, automatically continuing to receive the first MBMS service under the first MBSFN area.

5. The method of claim 3, wherein the step of sending the service join request when the first MBMS service is provided in at least one of MBSFN areas comprises:
- when the first MBMS service is provided in one of the plurality of MBSFN areas, sending the service join request to the target network for subscribing to the first MBMS service in the MBSFN area.

6. The method of claim 3, wherein the step of sending the service join request when the first MBMS service is provided in at least one of MBSFN areas comprises: when the first MBMS service is provided in more than one MBSFN areas, selecting an MBSFN area from a plurality of MBSFN areas providing the first MBMS service; and
- sending the service join request to the target network for subscribing to the first MBMS service in the selected MBSFN area.

7. The method of claim 3 further comprising:
- when the UE wants to subscribe to a second MBMS service after the first MBMS service is subscribed and the second MBMS service is provided in the same MBSFN area in which the first MBMS service is subscribed, selecting the same MBSFN area to subscribe to the second MBMS service.

\* \* \* \* \*